Feb. 18, 1930. J. I. MUNCY 1,747,179
TRANSMISSION CONTROL
Filed March 18, 1927 5 Sheets-Sheet 1
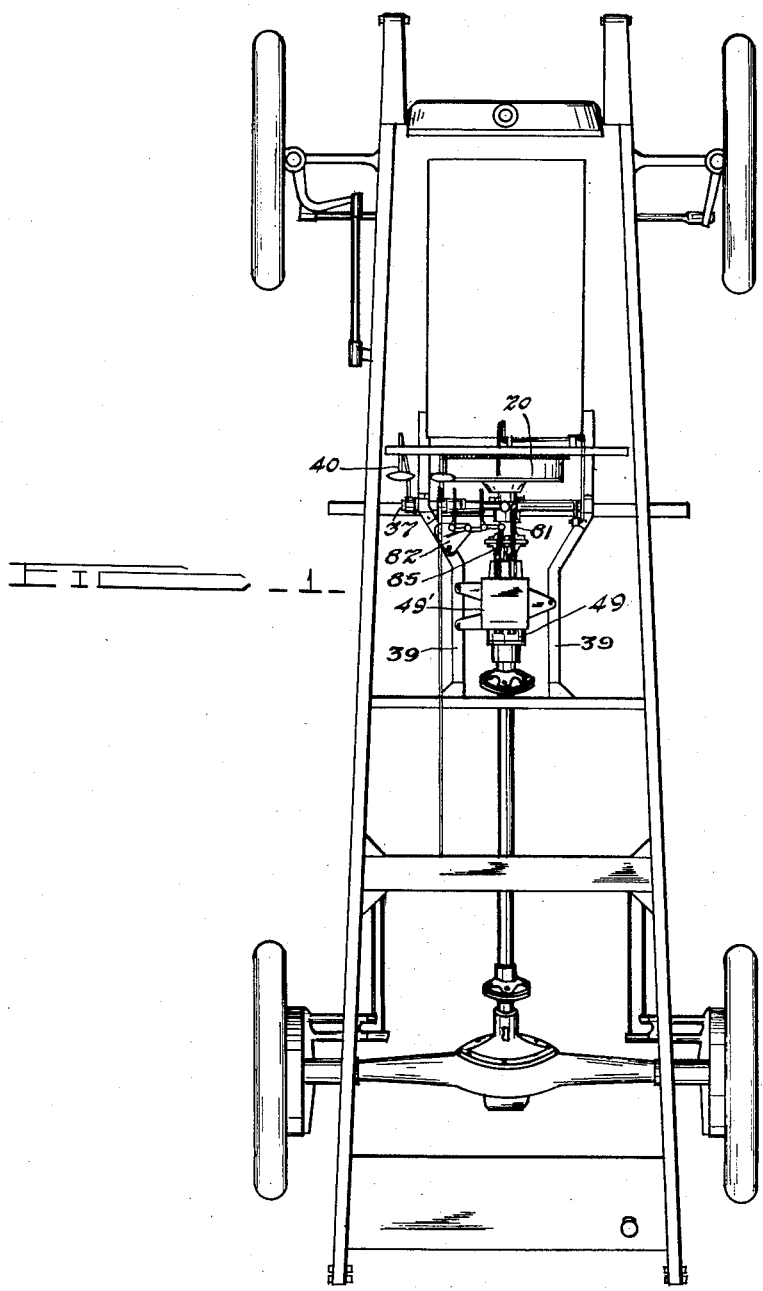
INVENTOR
John I. Muncy
BY
ATTORNEY

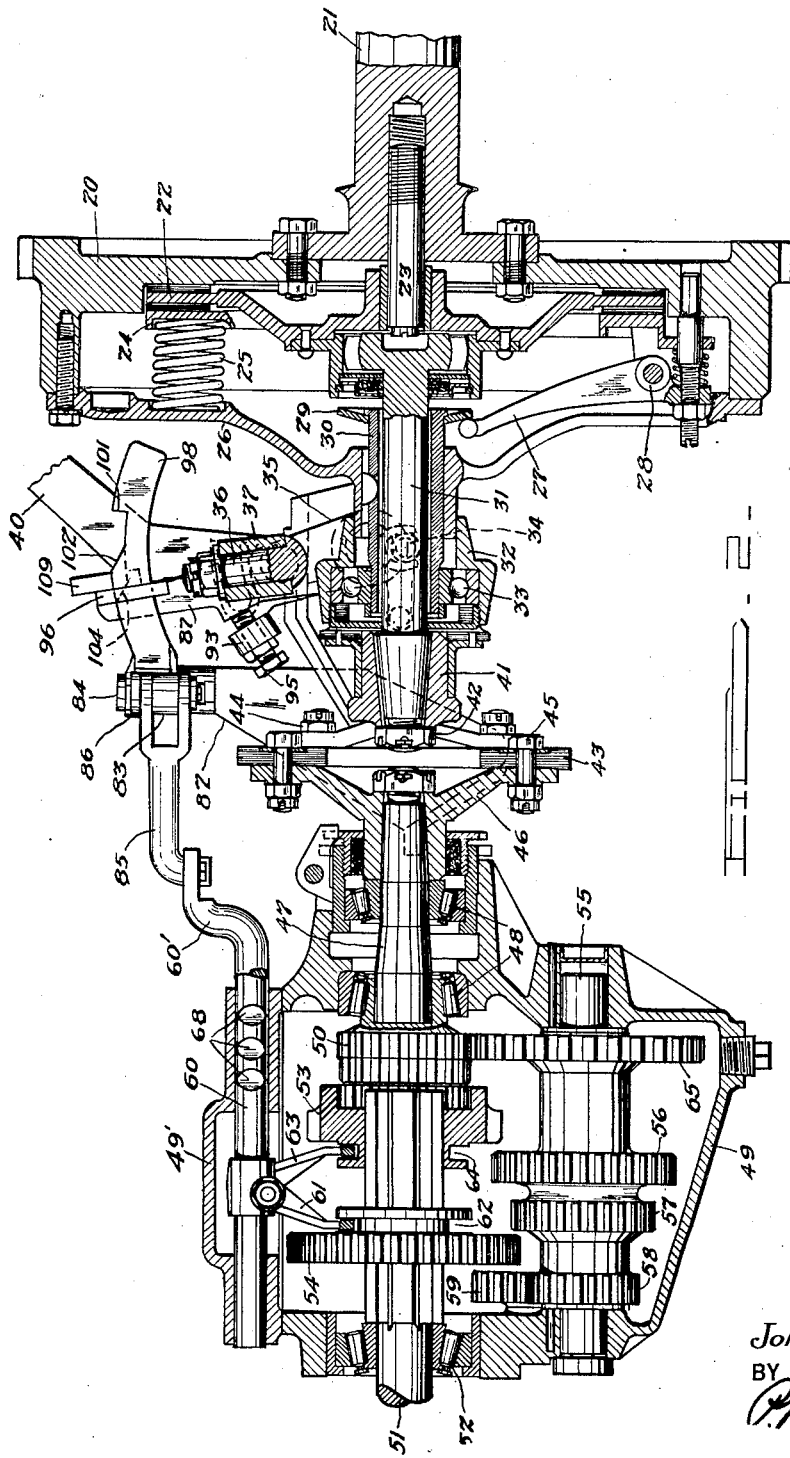

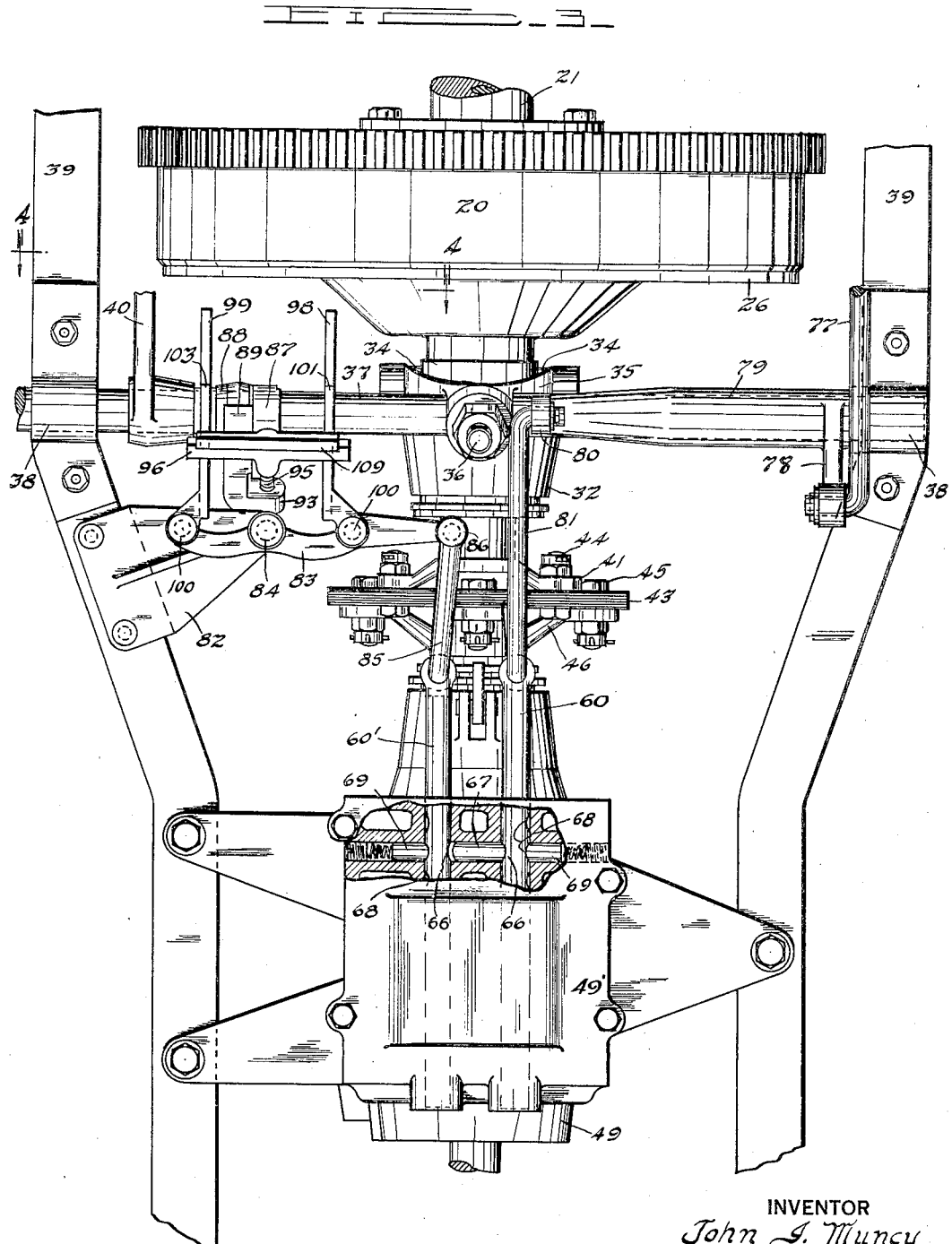

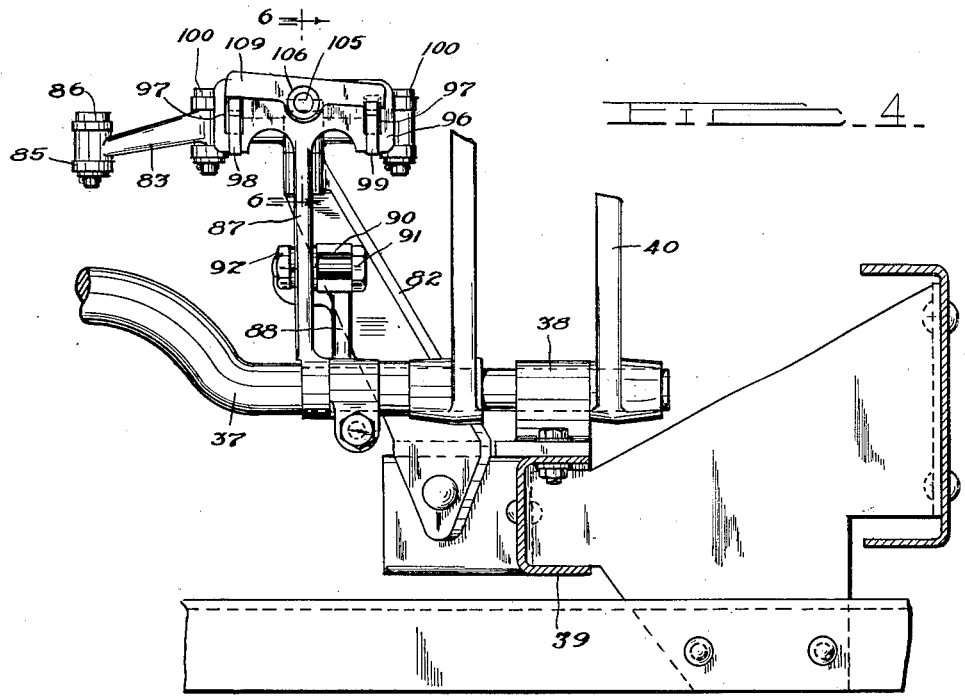
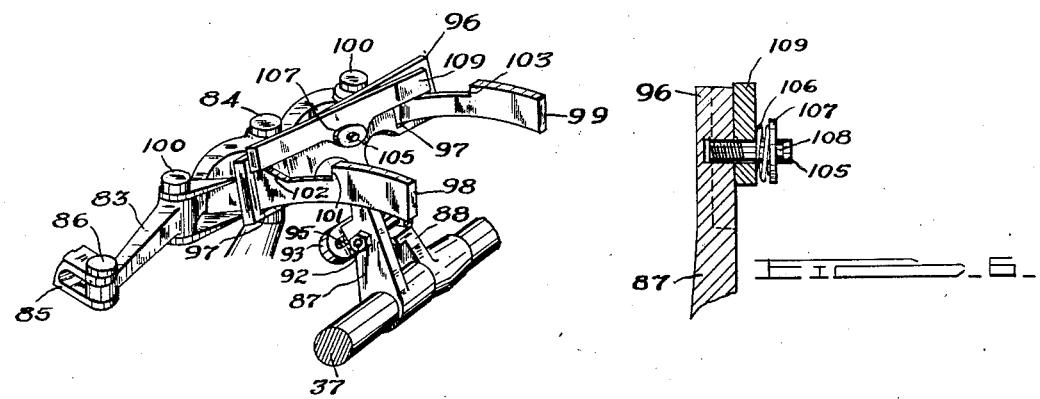

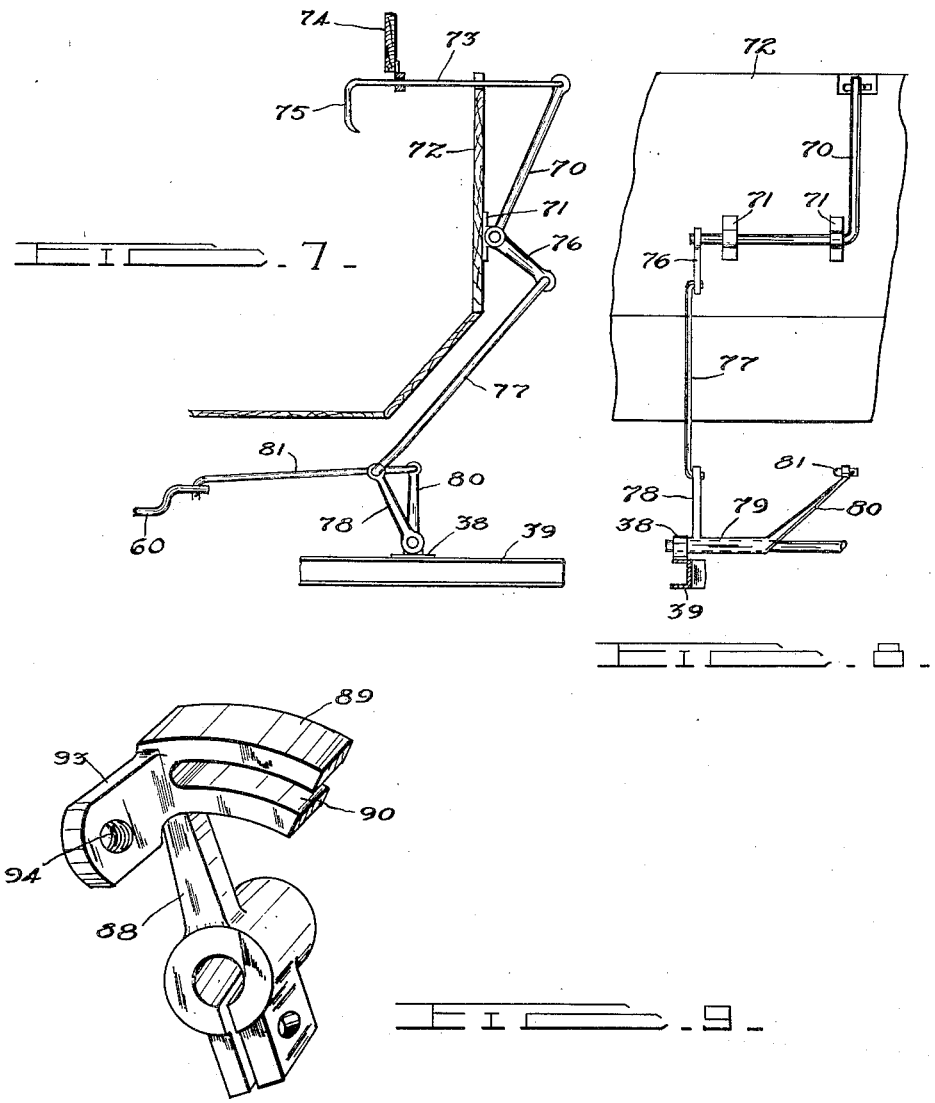

Patented Feb. 18, 1930

1,747,179

UNITED STATES PATENT OFFICE

JOHN I. MUNCY, OF SOUTH BEND, INDIANA, ASSIGNOR TO THE STUDEBAKER CORPORATION, OF SOUTH BEND, INDIANA, A CORPORATION OF NEW JERSEY

TRANSMISSION CONTROL

Application filed March 18, 1927. Serial No. 176,469.

This invention relates to motor vehicles, and particularly to means for controlling the speed changing mechanism thereof.

The principal object is to provide a simplified mechanism whereby the usual gear shift lever is eliminated from the center of the driving compartment floor, including the total elimination of manually operated means for shifting the high and intermediate transmission speed gears.

Another object is to provide a speed changing mechanism for motor vehicles and the like which is automatically shifted from intermediate to high speed, and from high speed to intermediate speed without any manual control whatsoever therefor, and the low and reverse speeds are shifted by manually controlled means only.

Another object is to provide a transmission mechanism which may be shifted alternately from high speed to intermediate speed, and from intermediate speed to high speed merely by continued full stroke movements of the foot pedal which controls the clutch between the motor and the transmission mechanisms.

Another object is to provide a shifting mechanism operable so that when the manually-controlled means is operated to set the transmission mechanism in low or reverse gear, the automatic shifting means for placing the transmission mechanism in intermediate or high gear is inoperative, and when the automatic shifting means is operated to place the transmission mechanism in high or intermediate gear, the manually controlled means for placing the transmission mechanism in low or reverse gear is inoperative.

Another object is to provide means whereby when the transmission is in one of its speed changing positions no other speed changing position may be engaged at the same time.

A further object is to provide an automatic gear shifting means comprising a double armed lever pivoted between its ends to oscillate in a horizontal plane and normally lying transversely of the length of the automobile of which it forms a part, one end of the lever being connected by suitable linkages to a gear shift rod, and being provided with a pair of forwardly extending arcuate arms pivoted thereto on each side of its pivot point, each arcuate arm being provided with a forwardly disposed abutment and a rearwardly disposed cam surface, the forward ends of these arcuate arms being slidably supported in a beam pivoted and movable with the clutch pedal mechanism, the beam being provided with an oscillating latch pivoted thereto midway between the arcuate arms in a plane transverse thereto and engageable with said cam surfaces and said abutments, one of said cam surfaces being normally disposed forwardly of the other whereby when the clutch pedal is allowed to assume clutch engaged position, the latch is caused to pivot and be placed in position to engage the abutment on the opposite arm upon forward movement of said pedal, whereby the arm incorporating the abutment thus engaged is drawn forward, moving the double armed lever and shifting the gear shift rod, and placing the cam surface on the engaged arm in position to move the latch to engage the abutment on the opposite arm on return movement of the clutch pedal, whereby on the next forward movement of the clutch pedal the double armed lever is moved in the opposite direction to shift the gear shift rod to another position.

The above being among the objects of the present invention the same consists of certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views, Figure 1 is a diagrammatic plan view of a motor vehicle chassis incorporating a suitable embodiment of the present invention, the relative location of which is shown in respect thereto.

Figure 2 is a sectional view taken vertically through the clutch and transmission of the motor vehicle shown in Figure 1, illustrating a portion of the automatic gear shifting mechanism therewith.

Figure 3 is an enlarged plan view of that part of the motor vehicle shown in Figure 1, more clearly illustrating the clutch, transmission, and gear shifting mechcanism, a portion of the transmission case being broken away to show the shifting rods.

Figure 4 is a fragmentary elevation of the automatic gear shifting mechanism taken approximately on the line 4—4 of Figure 3.

Figure 5 is a perspective view of the automatic gear shift selecting mechanism.

Figure 6 is a sectional view taken on the line 6—6 of Figure 4, showing the latch bar at its point of pivot on the actuating beam.

Figure 7 is a diagrammatic sectional view taken longitudinally of the vehicle in the region of the dash, showing the manually controlled means for shifting the transmission into low and reverse speeds.

Figure 8 is a front elevation of the parts shown in Figure 7.

Figure 9 is a perspective view of the lever which is adjustably connected to the clutch pedal shaft which permits the movement thereof to be utilized to shift the transmission gears for either high or intermediate speeds.

Due to the increased knowledge and ability of persons in driving motor vehicles, and because of the increased flexibility of motor vehicles as they are now being made, the first or low speed gear is seldom used when starting such vehicle, and such use is in fact ordinarily necessary only when going up a hill or in pulling out of a muddy, sandy or otherwise heavy bottom. The use of the reverse speed or gear is likewise infrequent, due to the small number of times its use is required in driving as compared to the intermediate and high speed gear positions. The present invention eliminates the customary gear shift lever and provides automatic means for shifting the intermediate and high speed gears only, these being the gears most frequently used in the required gear changes, and also provides manually controlled means for shifting the low and reverse gears which are less frequently used. By doing this I am enabled to provide a simple and inexpensive mechanism which, for the majority of all practical purposes, incorporates all the advantages of a full automatic gear shift without incorporating the usual disadvantages of cost, complication and bulk which are now present in mechanisms of this general character.

In accordance therewith, I show in the drawings a motor vehicle chassis conventional in every respect excepting for the means for shifting the transmission gears into their various positions. The clutch and transmission are of conventional construction excepting for the features noted, the clutch (see Figure 2) being built into the engine flywheel 20 which serves as a driving member therefor, and which is now rotatably secured to the engine crank shaft 21. The clutch driven plate 22, which is rotatably supported on the extending pin 23 in the rear end of the crank shaft 21, is adapted to be clamped against the inner face of the flywheel 20 by the pressure ring 24, which is urged thereagainst by a plurality of coil springs 25 held under tension between the same and the clutch cover plate 26. The pressure ring 24 is capable of being withdrawn from the plate 22 by conventional clutch levers 27 pivotally secured thereto at 28. The inner ends of the clutch levers slidably engage the rear face of the flange member 29 secured to the front end of the sleeve 30 which is axially and slidably mounted on the clutch driven shaft 31. A housing 32 slidably supported for axial movement on the tubular rear end portion of the clutch cover 26 is rotatably connected to the sleeve 30 for equal axial movement therewith by means of the bearing 33. The housing 32 is provided with two diametrically projecting pins 34 which are engaged by the slotted ends of the conventional shifter yoke 35 which is pivotally mounted about its upwardly projecting stud 36 received in the clutch shifter shaft 37. The clutch shifter shaft 37 is rotatably carried in the bearings 38 mounted on the sub-frame members 39, the clutch pedal 40 being secured thereto just inside the left hand sub-frame member 39. Upon forward movement of the free end of the clutch pedal 40, the shaft 37 is rocked in a clockwise direction as viewed in Figure 2, rocking the yoke member 35 and causing the housing 32 and sleeve 30 to move rearwardly. When the sleeve 30 is thus moved rearwardly, the flange member 29 carried by the forward end thereof moves the inner ends of the clutch levers 27 rearwardly to withdraw the pressure ring 24 from its normal operative position and disengages the clutch driven plate 22 from the ring 24 and the flywheel 20, thus allowing the shaft 31 to turn independently of the crank shaft 21.

A spider 41 secured to the tapered rear end of the clutch driven shaft 31 by the nut 42 is secured to the flexible fabric ring 43 by bolts 44, and the ring 43 is secured by bolts 45 to the spider 46 which in turn is secured to the forward end of the shaft 47 supported in the bearings 48 in the front end of the transmission housing 49. The rear end of the shaft 47 is formed to provide a conventional spur gear 50 adapted to rotatably receive the forward end of the splined transmission shaft 51 in the conventional manner. The rear end of the transmission shaft 51 projects through the rear wall of the housing 49 and is suitably supported therein by the bearing 52. Slidably and nonrotatably mounted on the transmission shaft 51 are the conventional sliding gears 53 and 54, and rotatably mounted on the counter shaft 55 carried by the housing 49 therebelow are the gears 56, 57 and 58. The conventional idler reverse gear 59 is suitably supported in meshing relation with the gear 58, and the gears 57 and 59 are positioned so as to be engageable by the gear 54 upon shifting of the position of the latter gear forwardly or rearwardly of its normal position indicated in Figure 2 to effect low and reverse speeds respectively in the conventional manner. The gear 56 is likewise positioned to be engaged by the gear 53 upon shifting of the latter rearwardly from its normal inoperative position indicated in Figure 2 to place the transmission in intermediate speed position, the gear 53 being formed with internal teeth in its forward face for telescopically receiving the teeth of the gear 50 when it is moved forwardly on the shaft 51 for effecting a direct drive between the shafts 47 and 51, as in conventional constructions.

The housing 49 is provided with a cover 49' which slidably supports the two axially movable shifter rods 60 and 60', which are provided with conventional yokes 61 and 63. The lower ends of the yokes 61 and 63 are loosely received in the grooves 62 and 64 formed on the gears 54 and 53, respectively, in the conventional manner, for controlling the shiftable position of the gears.

To prevent the transmission from being placed in more than one operative running position at one time, the adjacent faces of the shifter rods 60 and 60' are provided with notches 66, which are in opposed position when the transmission is in neutral position as shown. Between the notches 66, the conventional interlock 67 is slidably confined, the interlock 67 being of a length equal to the normal distance between the shifter rods 60 and 60' plus the depth of one of the grooves 66, so that when one of the rods 60 or 60' is shifted out of neutral position, the interlock 67 is caused to engage the groove 66 in the opposite shifter rod 60 or 60', thereby to lock that rod from movement. The outer faces of the rods 60 and 60' are each provided with the conventional notches 68, corresponding to the neutral and shiftable positions of the respective shifter rod 60 or 60'. Conventional spring detents 69 resiliently engage these notches in turn to prevent inadvertent movement of the rods 60 and 60' from any one of their shifted positions.

As previously pointed out, the present invention deals with means for automatically shifting the transmission between high and intermediate positions, and for manually shifting it between low and reverse positions. The means for accomplishing the latter is shown best in Figures 3, 7 and 8, and comprises a lever member 70 pivotally supported by the brackets 71 secured to the forward side of the dash 72. A rod 73 pivotally secured to the free end of the lever 70 extends rearwardly through the dash 72 to a point immediately under the instrument board 74 where it terminates in a handle 75. A lever 76 secured to the outer end of the shaft portion of the lever 70 is pivotally connected by a rod 77 to the free end of the lever 78 secured to the sleeve 79 rotatably mounted on the right hand end (as viewed in Figure 3) of the clutch shifter shaft 37. A lever 80 formed integrally with the sleeve 79 is pivotally connected by the rod 81 to the forward end of the shifter rod 60.

The operation of the manual control is readily apparent. When the handle 75 is pulled rearwardly the connections between the same and the shifter rod 60 cause the shifter rod 60 to move forwardly and place the transmission in low speed position. If the handle 75 is moved forwardly from its normal inoperative position indicated in the drawings, the shifter rod 60 is moved rearwardly and the transmission is placed in reverse speed position. If the shifter rod 60' has been moved out of neutral position, the interlock 67 prevents movement of the shifter rod 60 and consequently prevents movement of the handle 75 from neutral position.

The means for automatically shifting the transmission between high and intermediate speeds will now be described. Referring to Figure 3, it will be seen that an inwardly and upwardly projecting bracket 82 is secured to the left hand sub-frame member 39 a short distance rearwardly of the clutch shifter shaft 37. A lever 83 is pivotally mounted on the vertically extending pin 84 carried by the upper end of the bracket 82 to be swingable about a point substantially a third of its length from its outer end, in a horizontal plane. The inner end of the lever member 83 lies substantially in line with the axis of the shifter rod 60' and is pivotally connected to the forward end thereof by the link 85 and pin 86.

Rotatably mounted on the clutch shifter shaft 37 in line with the pin 84 is an upwardly extending lever 87. Secured against rotation to the shaft 37 is a shorter lever 88 extending upwardly in parallelism with the lever 87 and terminating in a thickened circumferentially extending end 89 (see Figure 9) which bears against the side of the lever member 87 and is provided with an arcuate slot 90. A cross bolt 91 extending through the lever 87 is received in the slot 90, as best shown in Figure 4, and receives thereon the nut 92 which serves to adjustably clamp the levers 87 and 88 together for equal movement. As indicated best in Figures 2 and 9, the lever 88 is provided with a transverse flange 93 extending back of the lever 87 and into the path thereof, it being provided with a threaded opening 94 (see Figure 9) for receiving the screw 95 (see Figure 2) which serves as an adjustable stop for the lever 87. The position of the lever 87 with respect to the lever 88 is adjusted by means of the screw 95 and the levers are then locked together in adjusted position by tightening up the nut 92 on the bolt 91, thereby clamping the levers together for equal turning movement with each other. The upper end of the lever 87 is provided with an integral cross bar or beam 96, each end of which is provided with a vertical slot 97 for a purpose presently to be described. Two arcuate cam members 98 and 99 are pivotally connected at their rear ends by the pins 100 to the lever 83 to be swingable in a horizontal plane, and are equally spaced on either side of the pin 84. Each cam member 98 and 99 projects forwardly from the lever 83 through one of the slots 97 in the cross bar 96 in which it is slidably received. The upper face of the right hand cam member 98 is machined to provide a formed vertical abutment 101 and a rearwardly inclined cam surface 102, and the left hand cam member 99 is formed to provide a corresponding abutment 103 and inclined surface 104. The vertical abutments 101 and 103 are so positioned on the respective cam members 98 and 99 that that they are in transverse alignment when the lever 83 is in its neutral position, but the inclined cam surface 102 is positioned so as to be ahead of the corresponding surface 104 when the lever 83 is in neutral position. A latch or rock bar 109 is secured at its center against the forward face of the cross bar 96 on the pin 105 by the spring 106, (see Figure 6) washer 107, and pin 108 to be swingable up and down about the pin 105. The spring 106 exerts sufficient force against the latch or rock bar 109 to create sufficient friction between the same and cross bar 96 to hold the rock bar 109 in any one of its swingable positions against inadvertent movement.

In practice the lever 87 is adjusted with respect to the lever 88 so that when the clutch is in engaged position and the transmission is in neutral position, the right hand end of the latch or rock bar 109 has been lifted by the cam surface 102 and rests on the upper surface of the cam member 98 immediately adjacent the surface 102, while the left hand end of the rock bar 109 has been depressed and rests at the bottom of the cut out portion between the abutment 103 and inclined cam surface 104, the cam surface 104 being positioned sufficiently to the rear of the corresponding cam surface 102 to allow this condition.

The description of the mechanism for automatically shifting the transmission between intermediate and direct speeds having been given, the operation will now be explained. Let us consider that the mechanism is in the position shown in the drawings, that is, with the transmission in neutral position, and the rock bar 109 positioned with its right hand end, as shown in Figure 3, or the left end as viewed in Figures 4 and 5, above the upper surface of the cam member 98 and its left hand end below the normal upper surface of the cam member 99. Now, if the clutch pedal 40 is depressed, rotating the clutch shifter shaft 37, the levers 87 and 88 are rotated forwardly therewith, the clutch becoming disengaged and the left hand end of the rock bar 109 (Figure 3) moving forwardly toward the abutment 103. The mechanism is so adjusted that before the end of the rock bar 109 reaches the abutment 103 the clutch is completely disengaged. From this point, upon further depression of the pedal 40, the left hand end (Figure 3) of the rock bar 109 comes into contact with the abutment 103, the right hand end clearing the abutment 101 because it has been moved above the same. Upon further depression of the pedal 40, and consequent forward movement of the lever 87 and cross bar 96, the rock bar 109 by its engagement with the abutment 103, carries the cam member 99 forwardly with it, causing the lever 83 to pivot about the pin 84 to move the right hand end (Figure 3) thereof rearwardly, the cam member 98 being moved rearwardly a relative amount in consequence of being pivotally connected thereto. When the right hand end of the lever 83 thus moves rearwardly, (see Figure 3) the link 85 and shifter rod 60' is moved rearwardly, and the gear 53 is moved rearwardly into engagement with the gear 56 and the transmission is placed in intermediate speed position.

If the pedal 40 is now allowed to return to its normal position, the clutch will become engaged and if the engine is rotating the vehicle will be driven forwardly in second or intermediate gear. It is to be noted that when the pedal is thus allowed to return to its normal position, the shifted position of the cam members 98 and 99, and the lever member 83 remains unchanged, but due to the fact that the cam member 99 has now been advanced and the cam member 98 has been moved rearwardly, the cam surface 104 on the cam member 99 has been advanced to a point forwardly of the corresponding cam surface 102 on the cam member 98, with the result that when the rock bar 109 moves back upon return of the pedal 40, the left hand end (Figure 3) of the rock bar 109 comes in contact with the cam surface 104 and is lifted above the normal upper surface line of the cam member 99, while the right hand end of the rock bar 109 is moved downwardly into the space between the abutment 101 and cam surface 102. When the mechanism is in such position, if the pedal 40 is again depressed, the rock bar 109 in moving forwardly contacts with the abutment 101 and carries the cam member 98 forwardly, the cam member 99 now moving rearwardly and the left hand end of the rock bar 109 clearing the abutment 103. When the cam member 98 is thus drawn forwardly, the lever 83 is again moved about the pin 84, but in a direction opposite to its first movement, with the result that the gear 53 is moved forwardly out of engagement with the gear 56. If the forward movement of the pedal 40 is stopped at this point, and allowed to return to its normal clutch engaged position, it will be evident that the mechanism will be in neutral position as shown in the drawings, but if the pedal 40, instead of being stopped, continues in its forward movement, the cam member 98 is carried farther forward with the right hand end of the lever 83 and the gear 53 is moved forwardly into locking engagement with the gear 50, thus placing the transmission in high or direct speed position. If the pedal 40 is now allowed to return to normal position, it will be evident that the rock bar 109 will be rocked to its other position so as to be engageable with the abutment 103 upon the next stroke of the pedal, due to the fact that the cam member 98 has been moved forwardly and the cam member 99 rearwardly, thus again placing the cam surface 102 in advance of the cam surface 104. Repeated depression of the pedal 40 will thus cause alternate engagement of the rock bar 109 with the abutments 101 and 103, with the result that the transmission will be alternately shifted from intermediate or second speed to direct or high speed position with each full stroke of the pedal 40.

When it is desired to place the transmission in neutral position, the pedal 40 is depressed only enough to bring the abutments 101 and 103 in transverse alignment and then allowed to return to normal position. This neutral position of the pedal 40 is easily felt by the foot because in that position the detent 69 drops into the central notch or groove 68 and offers sufficient resistance to being moved thereout to be easily detectable.

The interlock 67 serves to prevent either shifter rod 60 or 61' from being moved out of neutral position while the other shifter rod is in gear engaging position, and thereby prevents any possible interference between the manually shifted rod 60 or automatically shifted rod 60'. It is also important to note that in automatically shifting the mechanism from neutral position into gear engaging position, the first full stroke of the pedal 40 will always place the transmission in second speed position due to the fact that in the neutral position of the mechanism the cam surface 102 on the cam member 98 is always in advance of the corresponding cam surface 104 on the cam member 99, so that the left hand end (Figure 3) of rock bar 109 is always in lowered position when the mechanism is in neutral position and will engage the abutment 103 on the first stroke of the pedal 40 from neutral position of the mechanism.

When it is desired to shift the transmission into low speed or reverse position, the pedal 40 is depresesd sufficiently to disengage the clutch but not far enough to move the cam members 98 or 99, which position is easily felt by the foot as previously mentioned, and the handle 75 is then moved to bring the desired gears into engagement.

From the foregoing description and explanation it will be apparent that the present invention provides an extremely simple construction easy and economical to manufacture as well as to use, and one that provides substantially all of the advantages of a full automatic transmission shifting mechanism without incorporating the disadvantages thereof.

Formal changes may be made in the specific embodiment of the invention described without departing from the spirit and substance of the broad invention, the scope of which is commensurate with the appended claims.

What I claim is:

1. In a motor vehicle, automatic means actuated by depression of the clutch pedal forming the sole means for shifting the transmission between intermediate and direct drive positions at any speed of said vehicle, and manually operated means forming the sole means for shifting said transmission between low and reverse speed positions.

2. In combination with a motor vehicle and the transmission thereof, a pair of rods slidably carried by said transmission for placing said transmission in its various shiftable positions, automatically operated means forming the sole actuating means for one of said rods, and manually operated means forming the sole actuating means for the other of said rods.

3. In combination with a transmission mechanism having a shiftable element, a lever member pivoted between its ends and connected at one end to said shiftable element, a pair of arms pivotally connected to said lever members on either side of the pivotal point thereof, a bodily shiftable beam member slidably engaging each of said arms, an abutment on said arms, cam surfaces on said arms, and a latch member pivotally secured to said beam member and actuated by said cam surfaces to alternately engage each of said abutments upon a predetermined bodily movement of said beam member.

4. In a motor vehicle, in combination with the clutch and transmission mechanism thereof, a shiftable transmission element, a lever member pivoted between its ends engaged therewith for controlling the movement thereof, a pair of arms pivotally connected to said lever member on either side of the pivotal point thereof, a shiftable beam member connected for related movement with the clutch pedal and slidably engaging said arms, an abutment and a cam surface formed on each of said arms, a latch member carried by said beam member and acted upon by said cam surfaces whereby to be placed in position to engage said abutments upon a predetermined movement of said beam member, one of said cam surfaces being sufficiently in advance of the other of said cam surfaces when said transmission is in neutral position whereby said latch will engage one of said abutments upon bodily movement of said beam member and place said transmission in intermediate speed position before being placed in position to be capable of shifting said transmission to direct speed position.

5. In a motor vehicle, in combination with the transmission and clutch mechanism thereof, automatic gear shifting means comprising a double armed lever pivoted between its ends to oscillate in a horizontal plane and normally lying transversely of the length of said motor vehicle, one end of said lever being connected by suitable linkage to a gear shift rod, and provided with a pair of forwardly extending arcuate arms pivoted thereto on each side of its pivot point, each arcuate arm being provided with a forwardly disposed abutment and a rearwardly disposed cam surface, the forward end of said arcuate arms being slidably supported by a beam pivoted and movable with the clutch pedal mechanism, said beam being provided with an oscillating latch pivoted thereto midway between said arcuate arms in a plane transverse thereto and engageable with said cam surfaces and said abutments, one of said cam surfaces being normally disposed forwardly of the other thereof whereby when said pedal is allowed to assume clutch engaging position said latch is engaged thereby and caused to pivot and be placed in position to engage said abutment of said opposite arm upon forward movement of said pedal, whereby said arm incorporating said abutment thus engaged is drawn forward, moving said double arm lever and shifting said gear shift rod, and placing said cam surface on said engaged arm in position to move said latch to engage said abutment on the opposite of said arms on return movement of said clutch pedal, whereby on the next forward movement of said clutch pedal said double armed lever will be moved in the opposite direction to shift said gear shift rod to another position.

6. In combination with a transmission mechanism having a gear shifting element, a lever pivoted between its ends and connected to said element, a pair of arms connected to said lever, each having an abutment and a latch actuating means, a bodily movable beam co-operating with said arms, and a latch bar carried by said beam, said latch actuating means causing said latch bar to alternately engage said abutments on said arms to move said gear shifting element.

7. In a motor vehicle, the combination with the transmission and clutch thereof, of a shiftable element in said transmission, a lever pivoted between its ends and connected to said element, a pair of arms pivotally connected to said lever on either side of the pivot point thereof, latch engaging surfaces on said arms, a bodily movable beam connected for related movement with the clutch pedal of said vehicle, and a pivoted latch bar carried by said beam, said latch actuating surfaces causing said arms to alternately engage said beam for movement therewith.

Signed by me at South Bend, Indiana, this 16th day of March, 1927.

JOHN I. MUNCY.